Figure 1:
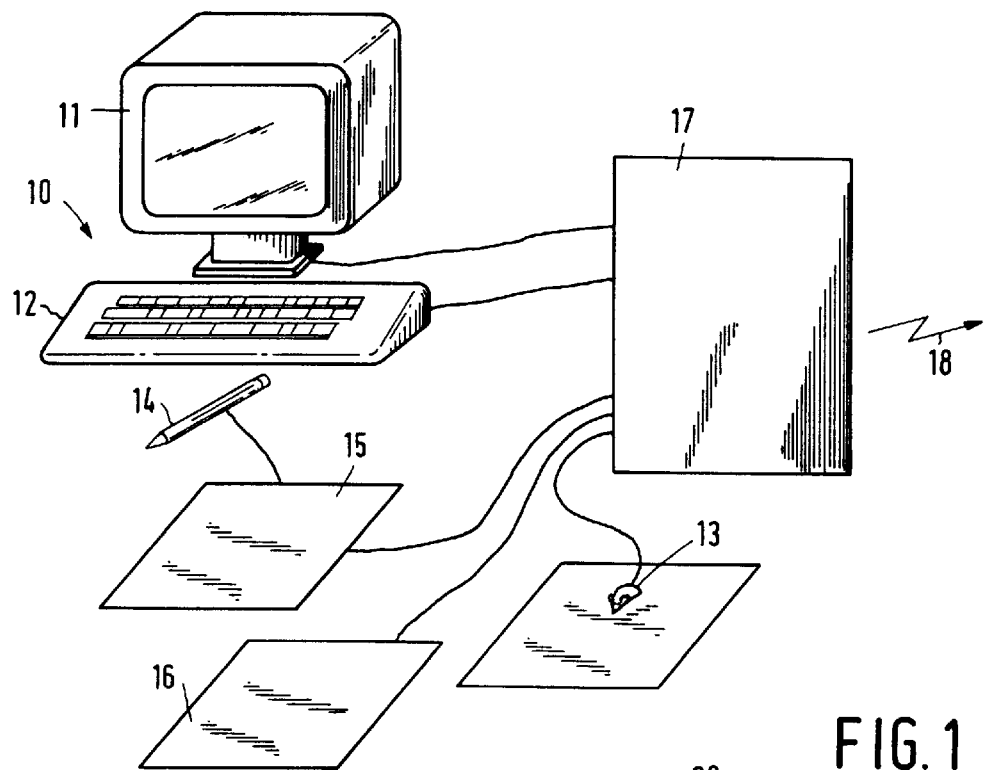

United States Patent [19]
Anderson et al.

[11] Patent Number: 5,943,039
[45] Date of Patent: *Aug. 24, 1999

[54] APPARATUS FOR THE INTERACTIVE HANDLING OF OBJECTS

[75] Inventors: Lisa C. Anderson; Kathleen L. Holman; Maurice G. B. F. Van Swaaij, all of Eindhoven, Netherlands

[73] Assignee: U.S. Philips Corporation, New York, N.Y.

[*] Notice: This patent is subject to a terminal disclaimer.

[21] Appl. No.: 09/129,811

[22] Filed: Aug. 6, 1998

Related U.S. Application Data

[63] Continuation of application No. 08/278,676, Jul. 20, 1994, Pat. No. 5,828,360, which is a continuation of application No. 08/021,640, Feb. 16, 1993, abandoned, which is a continuation of application No. 07/694,535, May 1, 1991, abandoned.

[30] Foreign Application Priority Data

Feb. 1, 1991 [EP] European Pat. Off. .............. 91200194

[51] Int. Cl.[6] ...................................... G09G 5/08
[52] U.S. Cl. ........................... 345/146; 345/902; 345/352
[58] Field of Search .................................... 345/146, 145, 345/156, 157, 164, 173, 115, 902, 352, 353; 178/18, 19

[56] References Cited

U.S. PATENT DOCUMENTS

| | | |
|---|---|---|
| 4,656,603 | 4/1987 | Dunn ....................... 364/900 |
| 4,763,356 | 8/1988 | Day, Jr. et al. ............................ 178/18 |
| 4,896,291 | 1/1990 | Gest et al. ................................ 364/900 |
| 5,828,360 | 10/1998 | Anderson et al. ....................... 345/146 |

FOREIGN PATENT DOCUMENTS 2166627 5/1986 United Kingdom .

OTHER PUBLICATIONS

"Directional Selection Is Easy as Pie Menus!", Don Hopkins University of Maryland, Fourth USENIX Computer Graphics Workshop, Cambridge, MA, Oct. 8–9, 1987; p. 103 of the minutes.

Microsoft Windows: Version 3.1 User's Guide (1990–1992) pp. 74–77.

Jack Callahan, "An Empirical Comparison of Pie vs. Linear Munus", pp. 1–14, Sep. 1987.

*Primary Examiner*—Regina Liang
*Attorney, Agent, or Firm*—Anne E. Barschall

[57] ABSTRACT

In an apparatus for handling objects such as documents and tools a menu of options (30) is displayed, which options (31a . . . 31h) are placed in a curved band (31) around the position of the cursor at the moment of activating the menu. The shape of the curved band is optimized for the movement of a hand-held pointer device, such as a stylus, and allows easy movement of the pointer device along the options. The band (31) may follow part of the circumference of a circle of which circle inner portions (32, 33) may be used for the display of several sets of sub-options.

1 Claim, 5 Drawing Sheets

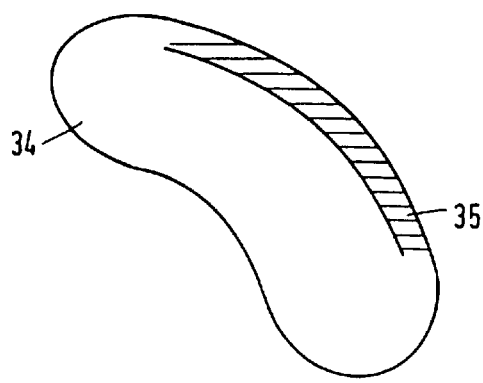
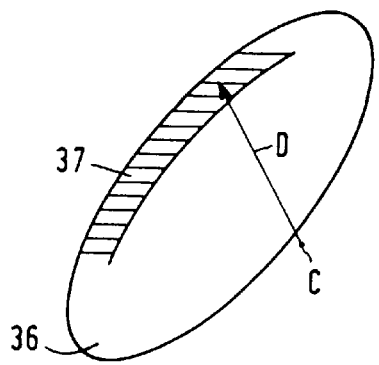
FIG.4a  FIG.4b
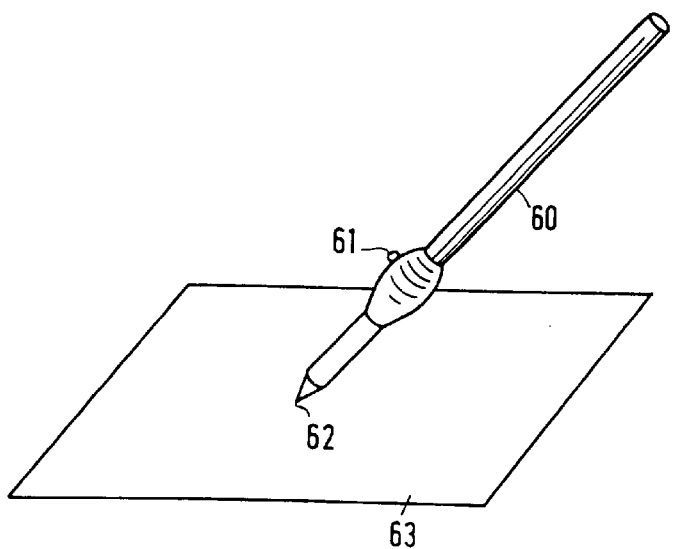
FIG.6
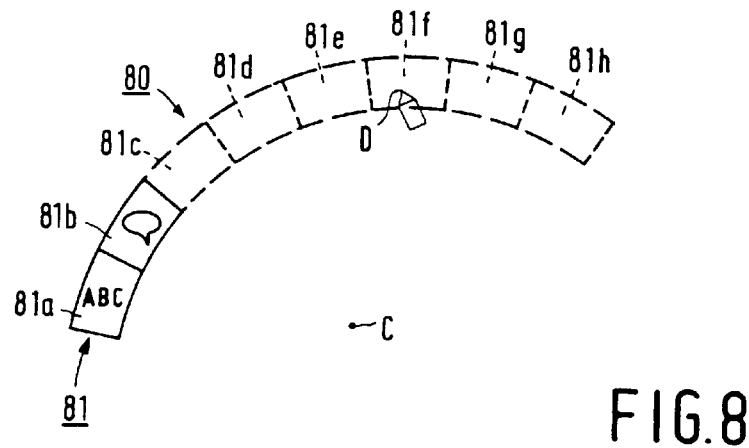
FIG.8

APPARATUS FOR THE INTERACTIVE HANDLING OF OBJECTS

CROSS REFERENCE TO RELATED APPLICATIONS

This is a continuation of application Ser. No. 08/278,676, filed Jul. 20, 1994 U.S. Pat. No. 5,828,360; which is a continuation of Ser. No. 08/021,640, filed Feb. 16, 1993, now abandoned; which is a continuation of Ser. No. 07/694,535, filed May 1, 1991, abandoned.

The invention relates to an apparatus for the interactive handling of objects, such as electronic documents and tools, which apparatus comprises a viewscreen for displaying thereon a menu of options and a pointer device for pointing at a corresponding area from a plurality of corresponding areas each associated with one of the options displayed on the viewscreen, and thereby selecting one of said options.

Such an apparatus or workstation is generally used for preparing, modifying and storing documents or sets of data in the form of electronical files kept in a dedicated or general purpose computer system. By entering commands to the input devices of the workstation documents are retrieved from a storage device, amended, copied, stored again in the storage device, etcetera. When the workstation is connected to other workstations by means of a local or public network, for example via telephone lines, documents can be transmitted to other workstations to be read by a person using the other workstation. For all these activities a number of tools are necessary to copy, transmit, store, etcetera the documents and sets of data. In the frame of the present application these tools, documents and the necessary supplemental executable programs and data are indicated with the general term objects. Documents are, for example, text documents, available as a string of characters, graphic documents available as a (compressed) bit map or a set of tabular or algorithmic data, voice documents in the form of digitized sound. A document may even take the form of an executable program. Relations between documents may exist and documents may comprise both text, graphic and sound data. Other kinds of objects are, for example, programs emulating a calculator, agenda, calendar and telephone directory or communication equipment, as a telephone or fax. In a workstation the objects are indicated on the screen much in the way objects are present on a desktop.

For the handling of the objects, selections have to be made. Both the selection of an object and the selection of an adjustment or an operation on the object. Such selections are commonly made by the display of a menu on which a number of available options is displayed, subsequently one of the options is selected by means of a pointer device such as dedicated keyboard buttons, a mouse or a stylus and digitizing tablet.

A menu is conventionally displayed in the form of vertical columns or horizontal rows of which the length is defined by the number of options. An example of such a menu is disclosed in GB-A 2 166 627. In choosing an option from such a menu the pointer device has to be moved over a path substantially corresponding to the horizontal or vertical lines along which the options are arranged. The human physiology is not well adapted to move a pointer device such as a mouse or a stylus along straight lines over predetermined paths and distances. This inconvenience may lead to frequent errors in selection and make a carefully visual inspection necessary before giving a command to the workstation that the presently indicated option is the desired one.

It is, inter alia, an object of the invention to provide an apparatus according to the introductory paragraph whereby the menu of options is displayed and whereby movements on or by the pointer device are adapted to hand movements that a human operator can make and remember easily. An apparatus in accordance with the invention is therefore characterized in that the apparatus comprises means for displaying the options on the viewscreen in a curved band and in that the corresponding areas are positioned in a corresponding band which is curved similar to the curved band on the viewscreen. While working with a pointer device such as a mouse or a stylus it is more easy to target area's along a curved line around a central area located somewhere beneath the hand of the operator on a desk than to follow substantially straight lines. Also travel of the pointer device from the centerpoint is reduced and it is easier to remember the position of each option by utilizing motor and spatial memory.

It is remarked that it is known per se from the "Fourth USENIX Computer Graphics Workshop" Cambridge, Mass., Oct. 8-9, 1987, page 103 of the minutes, to use a pie menu whereby choices are presented as sectors of a circle around the cursor position, so that the direction of the movement from the center of the pie menu outwards corresponds to a choice. It is not known from said disclosure to arrange the options in curved bands, of which the curvature is adopted to an easily performed movement of a hand-held pointer device.

An embodiment of the apparatus according to the invention is further characterized in that the apparatus is arranged for displaying the options in a substantially circular-, substantially elliptical- or kidney-shaped band. A distance of approximately 15 cm is about the maximum distance that can be reached by a hand-held pointer device without displacement of the hand of the operator. Distances from 3 to 10 cm can be easily reached without overstretching.

A preferred embodiment of the apparatus according to the invention is characterized in that the apparatus is arranged for displaying the options in a substantially circular-, substantially elliptical- or kidney-shaped band. Easy movement of a hand-held pointer device along a closed loop results in a roughly kidney shaped curve. As only part of the curve may be occupied with areas corresponding to presented options an elliptical or circular shaped band can be used instead. For symbolic and esthetical reasons the circular form may be preferred.

When only a portion of the curve is filled with options the preferred location for those options to be presented is the upper left part of the curve when the operator is right handed, and it is the upper right part when the operator is left handed. Switching from the one mode to the other can optionally be provided for in one and the same apparatus without much additional effort.

An embodiment of the apparatus according to the invention is further characterized in that the pointer device comprises a stylus and means for detecting the position of the same. A stylus provides an easily hand-held pointer device with which fast and accurate movements can be made, resulting in a quick and accurate selection of a desired option or a plurality of desired options.

Another embodiment of the apparatus according to the invention is characterized in that the pointer device comprises a touch-sensitive pad arranged for detecting the position of an arbitrary object on a touch-sensitive surface. In this embodiment a finger or an object such as a conventional pencil can be used for selection of an area corresponding to a desired option. Also other devices such as a data tablet can be used for indicating a position.

A preferred embodiment of the apparatus according to the invention is characterized in that an option is selectable for performing an operation on a previously selected object and in that the apparatus is provided with means for requesting the selection of an object after an option is selected when no object has been previously selected. An operation on an object, selected by indicating the corresponding option from the menu, can only be performed when an object is selected as well. If such an object was not previously selected, the operator will be reminded of the fact and will be requested to select one of the available objects on which the operation can be performed. It is therefore not necessary for the operator to observe a certain chronological order in selecting options and operations to be applied to the objects.

While working with a document or while performing other activities it is normally undesirable to have part of the viewscreen permanently occupied by the menu. A preferred embodiment of the apparatus according to the invention is therefore characterized in that the pointer device is provided with first command means for display of the menu and second command means for selecting options from said displayed menu. The first and second command means may be integrated in one button or may be, for example, a button and a touch sensitive tip of a stylus. The first and second command means may be different buttons of the pointer device, or may even be parts of an input peripheral of the apparatus without a direct physically connection to the pointer device, such as a keyboard.

An embodiment of the apparatus according to the invention is characterized in that command means are provided for display of the menu of options at a location on the viewscreen which corresponds to a position selectable by the pointer device. By first moving the pointer device to a specific area and subsequently activating the first command means the portion of the viewscreen that will be covered by the menu can be chosen by the operator. The menu can be removed from the screen by various means, such as selecting a specific "remove menu" option, activating the first command means again, or by selecting an option which implies that the menu is to be removed in addition to the selection of a designated function or object.

An embodiment of the apparatus according to the invention is further characterized in that the apparatus comprises further display means for displaying on the viewscreen at least one sub-menu of options along a further curved band and in that the apparatus comprises means for providing further corresponding areas positioned in a further corresponding band which is curved similar to the further curved band. Selection of a first option often makes it necessary or desirable to select sub-options. In an embodiment of the invention the sub-menu may already be made visible when the pointer device is positioned at the corresponding area for the first option, but before a selection command is given. This provides a better visual impression of what option is going to be selected. It also allows to select directly a sub-option and via the sub-option the first option, thereby making the explicit selection of the first option superfluous.

A preferred embodiment of the apparatus according to the invention is characterized in that it is adjustable to different working statuses and in that it is arranged for presenting on the menu a first set of options which are independent of the working status and a second set of options which are adjusted to a current working status. Options that are permanently available will be always displayed at the same locations in the presented menu. Options that have a meaning in a certain working status only are displayed exclusively when the apparatus is in that status.

A further embodiment of the apparatus according to the invention is characterized in that it is arranged for establishing corresponding areas associated with options in the menu before displaying the options on the viewscreen, and in that an option is selectable prior to display of that option on the viewscreen. It may occur that the operator is experienced and knows beforehand were to move the pointer device when the menu is activated without having to wait for the menu to appear completely on the viewscreen. In that case the selection is correctly performed. In an embodiment the display of the complete menu may be interrupted or skipped.

These and other, more detailed aspects of the invention will be described, by way of example, with reference to the accompanying drawings.

In the drawings shows

Figure 3:
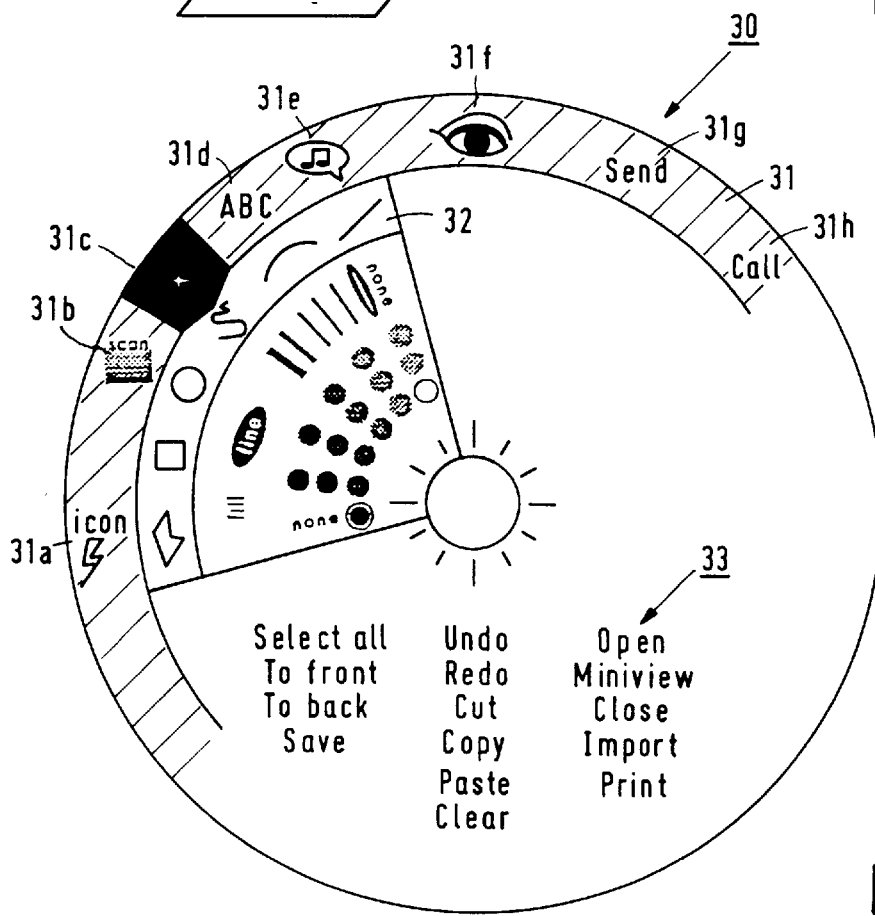
Figure 2A:
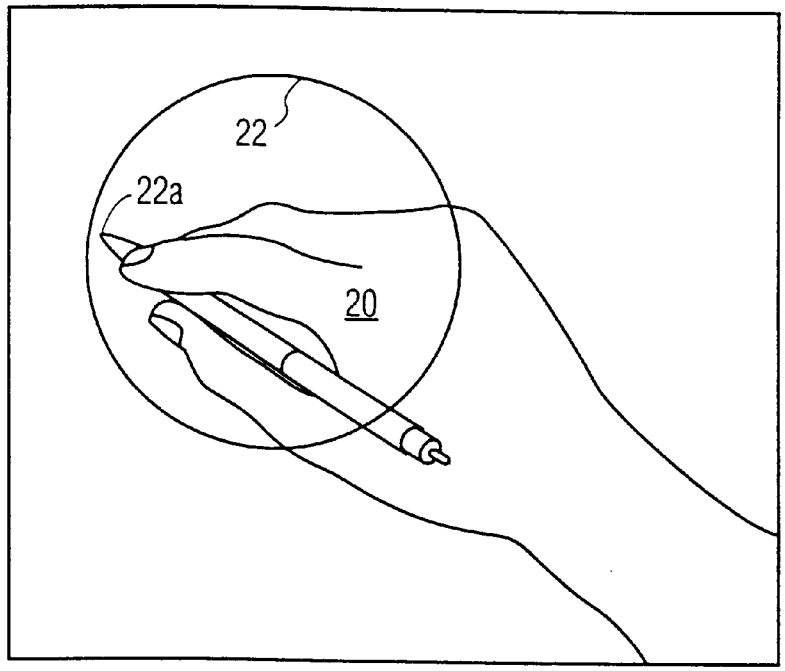
Figure 2B:
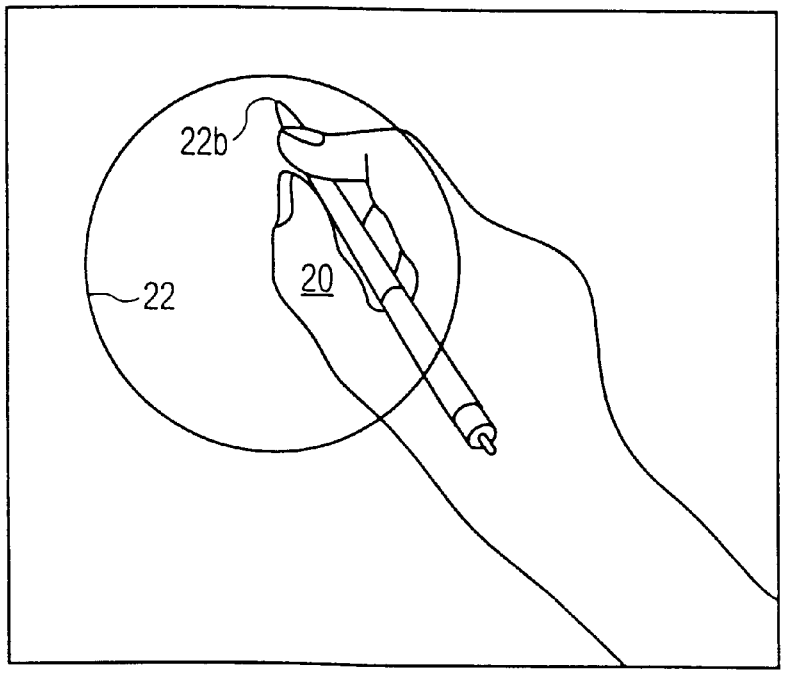
Figure 5A:
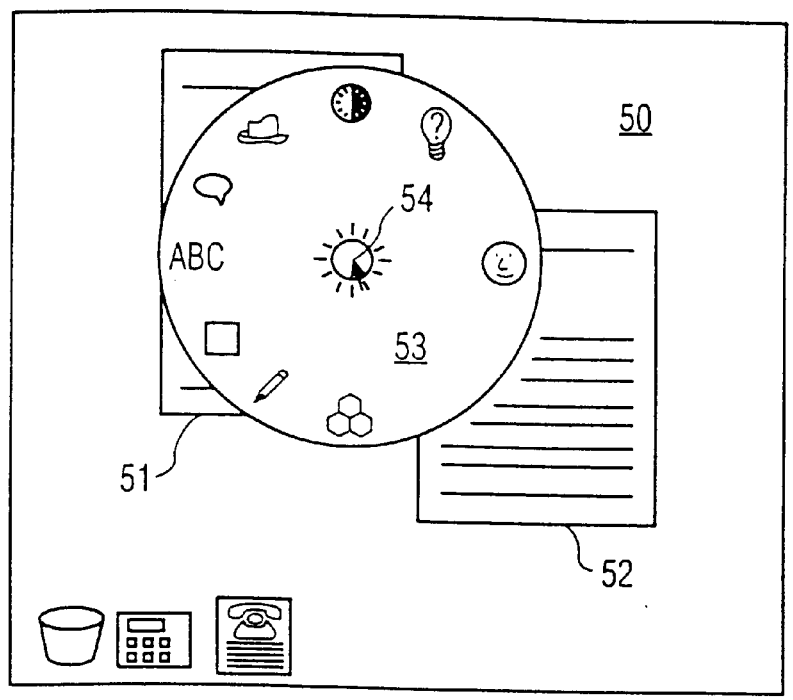
Figure 5B:
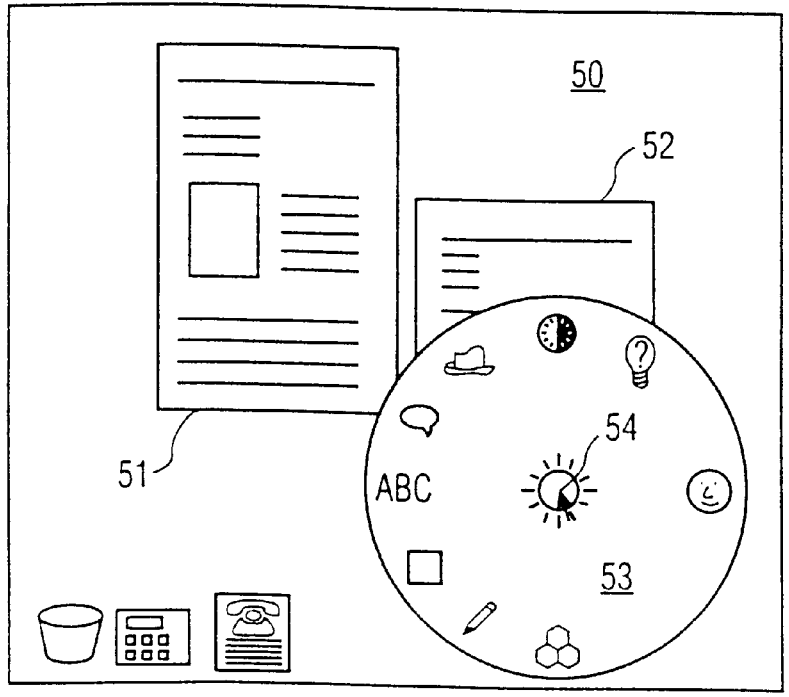

FIG. 1 a workstation comprising a viewscreen and several input devices;

FIGS. 2a and 2b the reach of an operators hand while holding a pointer device such as a stylus;

FIG. 3 a first embodiment of a menu whereby the options are aligned along a curved band;

FIGS. 4a, 4b elliptical and kidney shaped bands of which a portion is occupied by a number of options;

FIGS. 5a and 5b an impression of an image projected on the viewscreen with the menu displayed at different positions.

FIG. 6 in detail a stylus for use as a pointer device;

FIG. 7 a displayed menu with various sub-menu's depending on the position of the pointer device.

FIG. 8 a partially displayed menu when a rapid selection is made.

In FIG. 1 a workstation 10 is shown. This station comprises a viewscreen 11, for example a CRT or flat panel-screen together with the necessary electronics circuitry and other components for display on the screen of text and graphical information. A keyboard 12 is provided for entering text data and various commands into the workstation. Additional input devices are shown, a mouse 13, a stylus 14 with digitizing tablet 15 and a touch sensitive pad 16. A touch sensitive pad and the viewscreen can possibly be integrated to form a touch sensitive screen. Of the additional input devices no more than one is necessary in a workstation according to the invention. The workstation may comprise further devices, not shown in the Figure, such as a document scanner, a printer, a telephone etcetera. The devices are connected to steering and control hardware, and to a power supply, both of which are housed in a cabinet 17. The cabinet may comprise also a local storage unit in the form of a magnetic or solid state memory. The workstation may be connected via a link 18 to a computer for storage and transmission of data and/or may be connected directly or via the computer to a network to be able to communicate with other workstations. Such link may comprise wires or be partially wireless.

For the handling of documents and other objects available to the operator commands are to be given to the workstation via one of the input devices. A menu of commands may be displayed on the screen with options which can be chosen from by moving a cursor to the desired option by a corresponding movement of the mouse 13 or stylus 14, or by the movement of a finger or arbitrary object across the touch sensitive pad 16.

The options are presented on the screen as lying on a curved band. As shown in the FIGS. 2a and 2b this band is adapted such that the options can easily be reached from a hand without lifting the wrist from the desktop. In the Figures two positions of a hand 20 are shown while reaching at points 22a and 22b on a circle 22. The positions of the areas to be pointed at should be in a band within this circle and preferably following its circumference.

FIG. 3 shows a possible menu for display on the viewscreen according to the invention. The menu 30 is displayed as a disc with a number of options. In the menu three types of options can be a distinguished. A first portion, the shaded outer band 31, contains a number of main options 31a, 31b, 31c, . . . , 31h for the present working status. The options are mainly presented by icons. Shown are, as an example, an icon (31c) for drawing lines; for entering text (31d), for sending a document (31g) or for making a phonecall (31h). A second portion 32 of the disc menu shows a number of sub-options, associated with the presently highlighted main option 31c. The presented sub-menu allows the operator to choose a line type and color. The third portion 33 of the menu, which is adaptable to a certain working status, allows the user to choose a specific operation to be performed on the object that is handled presently.

FIGS. 4a and 4b show alternative shapes of the menu. FIG. 4a shows a kidney shaped menu 34 of which the main options are arranged in an outer band 35 in the upper right hand portion of the menu. These positions are optimized for a left handed operator. FIG. 4b shows an elliptical shaped menu 36 with the main options in a band 37 in the upper left hand side, i.e. optimized for a right-handed operator.

Each of the three shapes shown, or any other suitable shape, can be taken at will within the context of the present invention. In FIG. 4b a central point C for the curvature of the relevant portion of the band 37 is indicated. The radius of curvature D of the band 37 around the centerpoint C will be typically less than 15 cm, and preferably between 3 and 10 cm. The dimensions are determined by the size of the human hand and refer to the positions of the area's to be pointed at with the pointer device, not directly to the size of the menu on the viewscreen.

For most activities performed with a work station more than one selections have to be made. For example when a document has to be copied, printed or opened for further editing, both the document and an operation have to be selected. For communicating to another workstation, a document, an address or identification number and a way of transport have to be selected. In a workstation according to the present invention no predetermined chronological order for making these selections is to be followed. When print or open is selected the tool will operate on the document that was preselected before. If no document was preselected a request to the operator is presented for selecting one of documents available for this particular operation, including of course the possibility to open a new document. The request may be presented in the form of a menu with all available documents.

If an option for establishing a communication link is selected, for example a telephone line, also a source of information to be transmitted has to be known to the system and the destination. If both source and/or destination are unknown a menu will be presented containing the possible sources and/or the possible destinations taking into account the available ones in the present working status.

FIGS. 5a and 5b show images of the picture visible on a viewscreen of an apparatus according to the invention. The screen 50 shows two documents 51 and 52, together with a disc menu 53 which contains options that can be selected for performing operations on the document. Either document may be a text document, a graphic document or a voice document for example represented as many small bars or other symbols which indicate volume and/or pitch of the sound. The screen further shows many other things that are to be used, such as a garbage bin, a calculator, or icon indicating a phone directory, etcetera. In order to be sure that the menu does not eclipse a part of the screen with information that should remain visible, the position of a cursor 54, associated to the position of the pointing device, is taken as centerpoint of the displayed disc menu. FIGS. 5a and 5b show the menu at different places on the screen. In determining the position of the menu from the position of the cursor care has to be taken that the whole menu is on the screen, even if the cursor is very close to the edge. In such a case the control section of the apparatus will not take the cursor position as the centerpoint of the disk menu.

FIG. 6 shows a stylus, designed for use with an apparatus according to the present invention. The stylus 60 comprises two buttons, a first button 61 at the side, a few cm from the tip. This button is located such that the index or thumb of the operator will rest on it. The second button 62, for example a microswitch, is located in the tip and is activated by pressing the stylus on a surface. The position of the stylus can be detected by a digitizing tablet 63 and the activation of the buttons is communicated, to the control section, for example wirelessly by electromagnetic or ultrasonic signals.

Several modes of selecting one or more options from a menu are possible. In a first mode the menu is displayed when and as long as the first button 61 is activated. Hovering above the desired option will highlight it, and it is actually selected when the first button 61 released. The menu is removed from the screen at the same time. In a second mode of operation the menu is also displayed when and as long as the first button 61 is activated. Hovering with the stylus will highlight an option. Pressing the second button 62 will select the command to be performed corresponding to the highlighted option, more than one command can be performed, by subsequently pressing button 62 at several options. A third mode of operation uses button 61 to display the menu on the screen, options are chosen by pressing button 62. The menu is removed by a special "hide menu" option.

A two button stylus has an advantage over a single button stylus in that the second button can also be used when the menu is not appearing on the screen for example for "writing" on a displayed document.

Figure 7A:
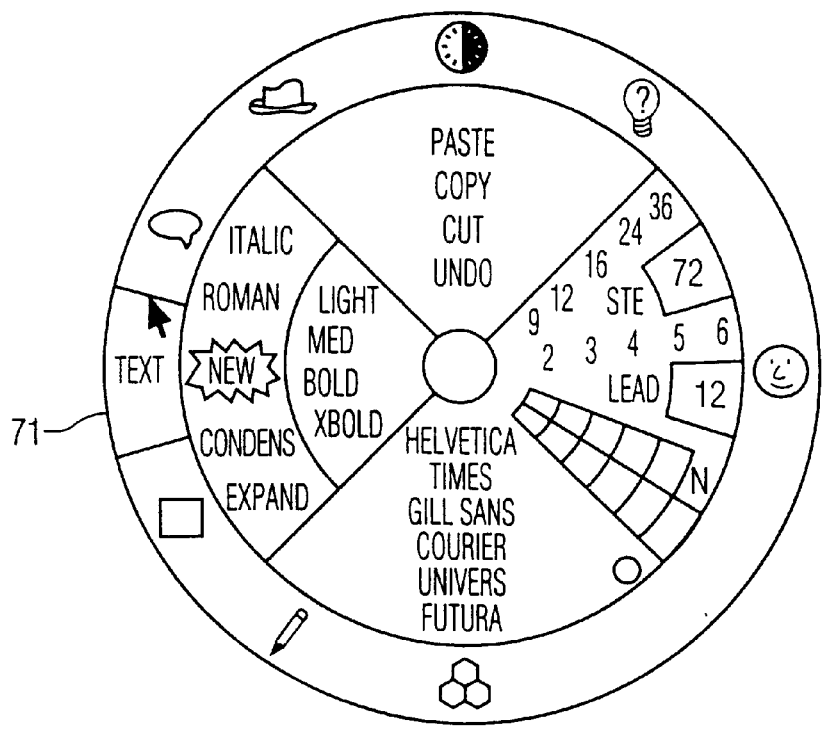
Figure 7B:
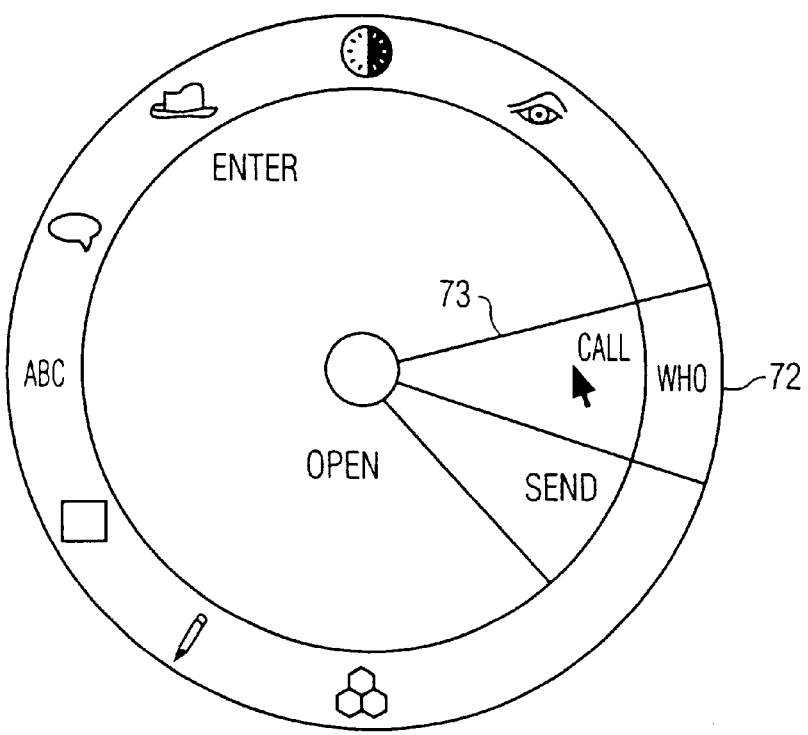

A menu 70 with several sub-menu's is shown in FIGS. 7a and 7b. In FIG. 7a the highlighted main option 71 is for specifying or editing text, and a set of sub-options is shown. The sub-options include type faces and sizes and the color or shade of the characters and their background. Further options include the selection, copy or insertion of portions of text, or to reverse the last action taken. In FIG. 7b a different set of sub-options is shown, which are associated with another main option, shown is a main option 72 and the selected sub-option 73 is "establish a connection with another workstation".

In FIGS. 8 an additional feature of the apparatus according to the invention is illustrated. As the organization of the menu allows a fast reaction of the operator to the options available in the menu with few errors, it may occur that the operator becomes experienced and knows beforehand were to move the pointer device when the menu is activated without waiting for the display of the menu to appear completely on the viewscreen. According to the invention the apparatus is arranged to associate firstly area's relative to the position of the pointer device at the moment the menu is activated to the various options and only later to present the options on the viewscreen. A movement of the pointer device to one of the corresponding areas and starting the selection procedure will result in the option being selected before the menu is fully displayed on the screen. When selection of an option implies removal of the menu from the screen the menu will disappear before it is completely displayed. Depending on the implementation of the display procedure for the menu, it may occur that the menu will not appear at all on the screen when such rapid selection is made.

In FIG. 8 a menu 80 in the process of being displayed is shown. A curved band 81 is shown around a central point C, the latter corresponding to the position indicated by the pointer device at the moment the menu is activated. The position of two options 81a and 81b, are already displayed on the screen. Further options 81c till 81h are to be displayed but not yet present inside the band 81, the position of these options is indicated in the figure by dashed lines. Immediately after the operator has activated the menu he moves the pointer device to a point D within the corresponding area of option 81f for selecting that option. From previous experience he knows that the option he intends to select will appear at this location 81f. The apparatus now allows to select the option before actual display of the corresponding icon at location 81f takes place.

We claim:

1. A graphical user interface displayed on a view screen, the interface comprising:

a plurality of position dependent election opportunities displayed along at least one internal curved path upon said screen, a curve of said internal curved path being such that normals to the curvature of said internal curved path appear to lie within a surface of the display, the election opportunities being selectable by motion of an external pointing action, the external pointing action pointing at corresponding areas, each corresponding area being associated with one of the election opportunities, the corresponding areas being positioned in at least one external curved path, the external curved path being curved similarly to the internal curved path, whereby the external curved path can be traced easily with lifting motion of a wrist of a user and the curve of the internal curved path suggests such a motion to the user.

* * * * *